UNITED STATES PATENT OFFICE.

JAMES H. REEVE, OF SALT LAKE CITY, UTAH.

PROCESS OF RECOVERING POTASSIUM SALTS FROM SALINE MIXTURES CONTAINING THE SAME.

1,304,097.

Specification of Letters Patent.

Patented May 20, 1919.

No Drawing. Application filed September 26, 1918. Serial No. 255,346.

*To all whom it may concern:*

Be it known that I, JAMES H. REEVE, a citizen of the United States, residing at Salt Lake City, in the county of Salt Lake and State of Utah, have invented certain new and useful Improvements in Processes of Recovering Potassium Salts from Saline Mixtures Containing the Same, of which the following is a specification.

My invention relates to improvements in processes of recovering potassium salts from saline mixtures containing the same.

An important object of my invention is to recover and refine low grade potassium salts into commercially pure potassium chlorid, at an economical cost.

The present invention is applicable to any saline mixture containing water-soluble potassium salts, and is particularly applicable to the refining, purifying, or recovery of commercially pure potassium salts from low grade potassium salts, such as are produced from the waters of Great Salt Lake.

In accordance with the practice of my process, in its preferred form, the water from Great Salt Lake, which contains a large percentage of sodium chlorid with small percentages of potassium chlorid and magnesium chlorid and sulfate, is transferred into suitable containers, and evaporated by solar or artificial means, until it is saturated in respect to its potassium content. During this step, the water has deposited the majority of its sodium chlorid content. The liquor at this point has a gravity of from 34° to 35° Baumé, cold, and has the following approximate composition:

| | |
|---|---|
| Water | 66.66% |
| K | 2.44 |
| Na | 2.66 |
| Mg | 5.04 |
| Cl | 14.83 |
| So | 8.37 |
| Total | 100.00% |

The liquor is now separated from the salts precipitated by the first step, and this liquor is then transferred to another container, and evaporated by solar or artificial means, until its potassium content has decreased to one-quarter of one per cent. or less. The salts precipitated by this step contain approximately twenty per cent. potassium chlorid, together with magnesium sulfate and sodium chlorid. The mother liquor is now separated from these precipitated salts, and has a gravity of 37° to 38° Baumé, cold, and consists of an almost pure solution of magnesium chlorid, which can be employed in a subsequent step of the process, if desired.

The low grade potassium salts, obtained in the preceding second step, which salts contain approximately twenty per cent. potassium chlorid, are then digested in a 36° to 37° Baumé solution of magnesium chlorid, at a temperature of 115° C., which is just beneath the boiling point of the solution, for a period of several hours, until the potassium salts, formerly in the low grade mixture of the same have dissolved in the magnesium chlorid liquor. The mixture of liquor and crystals is thoroughly agitated during the entire period of digestion. The magnesium chlorid liquor, at the above stated Baumé and temperature, dissolve about two per cent. of its weight of potassium chlorid, but does not dissolve and of the other salts present. I have found that fifty pounds of magnesium chlorid liquor should be used for each one pound of potassium chlorid, to be recovered. The liquor which now contains the potassium chlorid in solution, is separated while hot, from the undissolved crystals of magnesium sulfate and sodium chlorid.

The hot liquor obtained from the preceding step, is then cooled to 40° C., or lower, causing the potassium chlorid contained therein, to be precipitated as the double salt of potassium and magnesium chlorid. This double salt is commercially known as carnallite. The mother liquor, consisting of magnesium chlorid solution, is separated from the carnallite crystals, and is used over again in subsequent operations.

The double salt of carnallite crystals are then digested with approximately one-half their weight of cold water, by adding the water and agitating while cold, for several hours. This agitating with cold water decomposes the double salt or carnallite, the water taking up the magnesium chlorid in solution, and leaving the majority of the potassium chlorid crystals undissolved. These potassium chlorid crystals are now separated from the mother liquor, and analyze 80 per cent. to 90 per cent. potassium chlorid, the remaining percentage being sodium chlorid and magnesium chlorid, The liquor from the cold water digestion step, which liquor now contains magnesium chlorid and some potassium chlorid, is added to the 36° to 37° Baumé magnesium chlorid liquor from the hot digest step of the next cycle of operation. Upon cooling this liquid mass, the potassium chlorid contained therein from the cold digest liquor, is again precipitated, as carnallite, along with the regular crop of carnallite crystals from this cycle of operation. These carnallite crystals are subsequently subjected to the action of the cold water digestion, for the recovery of the potassium chlorid, as herein before described.

In the practice of my process, as herein before described, the potassium salt was present, in the mixture, as potassium chlorid. However, should this potassium salt be present as a carbonate, sulfate, nitrate, or borate of potassium when digested in the magnesium chlorid solution, at the gravity and temperature stated, such potassium salt would be converted into the soluble potassium chlorid, with the formation of the carbonate, sulfate, nitrate, or borate of magnesium. These magnesium compounds are insoluble in magnesium chlorid solution, and may be readily separated from the liquor, with other undissolved salts. The potassium chlorid remains in solution in the hot liquor, and is subsequently recovered, as high grade potassium chlorid, as herein before explained.

It is to be understood that the form of my invention herewith described is to be taken as a preferred example of the same, and that various changes may be resorted to in the order of the steps of the process, and that known chemical equivalents may be employed, without departing from the spirit of my invention or the scope of the subjoined claims.

Having thus described my invention, I claim:

1. The herein described process of obtaining potassium salts from saline liquors containing the same, which consists in evaporating the liquor until it is saturated in respect to its potassium salts content, separating the liquor from the precipitated salts, evaporating the liquor until it precipitates substantially all of its potassium salt content in a mixture of salts, separating the liquor from the salts, digesting the salts in a hot solution of magnesium chlorid to dissolve the potassium salt content while the remaining salts are undissolved, separating the liquor thus obtained from the remaining undissolved salts, cooling the liquor to obtain carnallite, separating the carnallite from the liquor, and separating the magnesium chlorid from the carnallite crystals thereby obtaining high grade potassium chlorid.

2. The herein described process of recovering potassium salts from saline mixtures, which consists in digesting the low grade potassium salts in a solution of magnesium chlorid of a gravity of 36° and 37° Baumé at substantially 115° C. for several hours whereby the potassium salts are taken into solution and the remaining salts are undissolved, separating the hot liquor thus obtained from the remaining undissolved salts, cooling the liquor thus obtained to obtain carnallite, and separating the magnesium chlorid content of the carnallite from the potassium chlorid content.

3. The herein described process of recovering potassium salts from saline mixtures, which consists in digesting the low grade potassium salts in a hot solution of magnesium chlorid whereby the potassium salts are taken into solution and the remaining salts are undissolved, separating the hot liquor thus obtained from the remaining undissolved salts, cooling the liquor thus obtained to precipitate carnallite, and separating the magnesium chlorid content of the carnallite from the potassium chlorid content.

4. The herein described process of recovering potassium salts from saline mixtures which consists in subjecting the saline mixtures to the action of hot magnesium chlorid solution of a gravity of substantially 36° to 37° Baumé in approximately the proportion of 2 per cent. by weight of the potassium salt to the weight of the magnesium chlorid liquor, separating the hot magnesium chlorid liquor having the potassium chlorid in solution therein from the undissolved salts contained therein, and cooling the liquor to obtain the double salt of potassium and magnesium chlorid.

5. The herein described process of recovering potassium salts from saline mixtures, which consists in subjecting a mixture of salts containing soluble potassium salts and other salts insoluble in a hot solution of magnesium chlorid to the action of a hot solution of magnesium chlorid whereby the potassium salts are taken into solution, separating the liquor thus obtained from the undissolved salts contained therein, cooling the liquor to obtain carnallite, separating the liquor from the carnallite, adding to the carnallite a sufficient amount of cold water to decompose the double salt and dissolve the magnesium chlorid, and separating out the high grade potassium chlorid which is substantially insoluble in the cold magnesium chlorid solution formed.

6. The herein described process of recovering potassium salts from saline mixtures, which consists in digesting the low grade potassium salts in a hot solution of magnesium chlorid, of a gravity of 36° to 37° Baumé, separating out the liquor containing the potassium chlorid in solution, allowing the solution thus separated to cool, whereby the potassium chlorid is precipitated as a double salt of potassium and magnesium, digesting these double salts with cold water to remove the magnesium chlorid, separating the liquor which contains the magnesium chlorid from the resultant potassium chlorid crystals, adding this liquor to the 36° to 37° Baumé magnesium chlorid solution used in the hot digestion step of the next cycle and again precipitating the unrecovered potassium chlorid as carnallite, removing the magnesium chlorid from the carnallite and recovering the potassium salts as high grade potassium chlorid.

7. The herein described process of recovering potassium salts from saline mixtures, which consists in digesting a mixture containing potassium carbonate, sulfate, nitrate or borate and other salts, in a hot magnesium chlorid solution to convert the potassium into soluble potassium chlorid and the carbonate, sulfate, nitrate or borate into the insoluble magnesium salt of same; separating the hot liquor from the insoluble salts, cooling this liquor to obtain carnallite, and recovering the potassium chlorid from same as a high grade product.

In testimony whereof I affix my signature in presence of two witnesses.

JAMES H. REEVE.

Witnesses:
R. NELSON,
R. L. RIGGS.